UNITED STATES PATENT OFFICE.

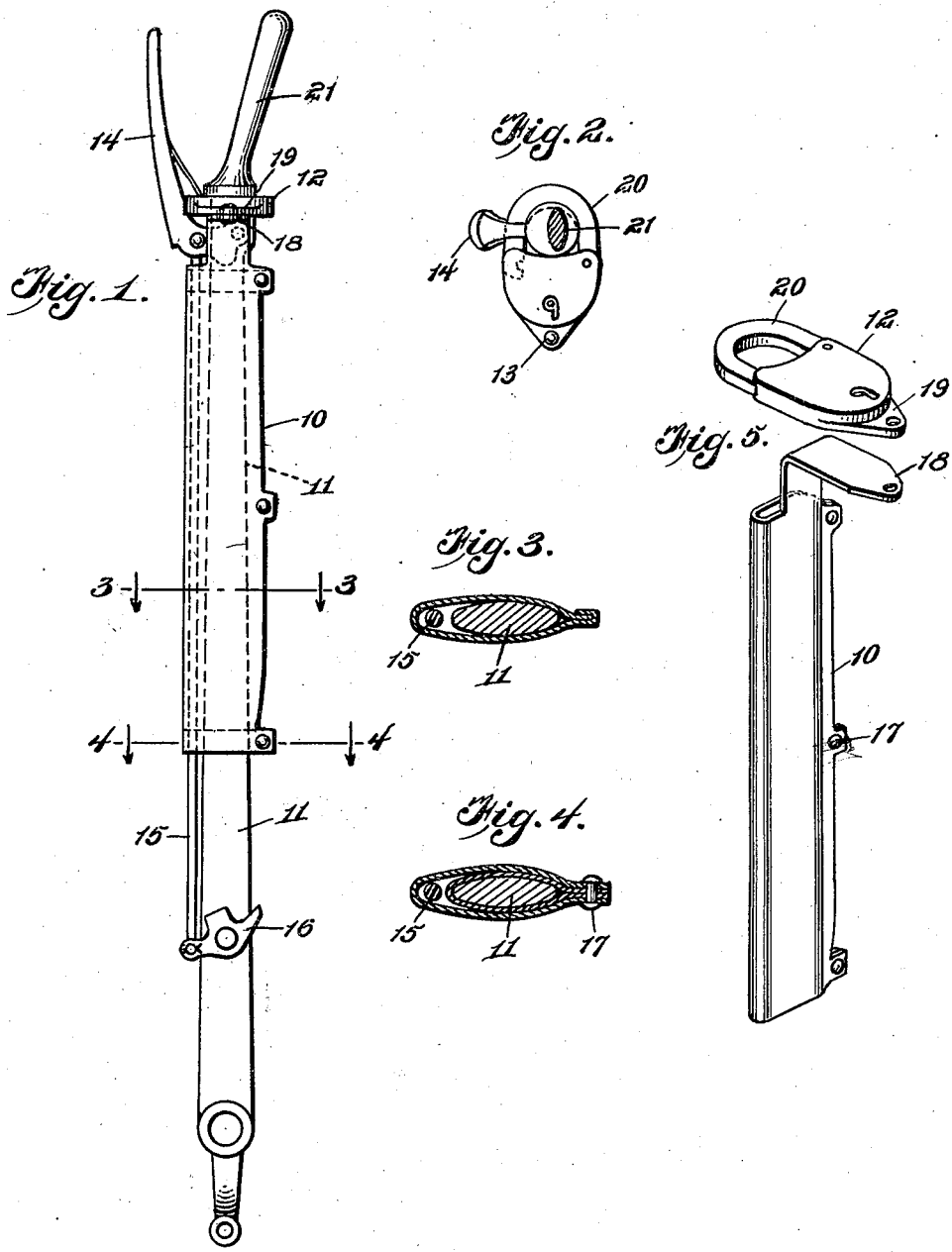

JAMES P. HEADLEY, JR., OF NEW ORLEANS, LOUISIANA.

LOCKING ATTACHMENT.

1,342,020.

Specification of Letters Patent.    Patented June 1, 1920.

Application filed July 28, 1919. Serial No. 313,853.

*To all whom it may concern:*

Be it known that I, JAMES P. HEADLEY, Jr., a citizen of the United States, residing at 3232 Prytania St., New Orleans, in the parish of Orleans and State of Louisiana, have invented new and useful Improvements in Locking Attachments, of which the following is a specification.

The object of the invention is to provide a simple and readily applicable locking means for automobiles and similar lever controlled vehicles, particularly of that type employing a brake lever with clutch controlled means for maintaining the lever in brake applied position, and more especially to that type of vehicle, of which the commercial Ford car is an example, wherein a common lever is employed not only as a brake operating means, but as a high speed control, and wherein by preventing the disengagement of the clutch mechanism by which the lever is held in its brake applied position it is possible to both prevent the release of the brakes and the adjustment of the transmission devices.

Moreover, and in this connection, it is the object of the invention to provide a locking means which may either form a part of the car as originally constructed or be attached thereto subsequently without invoking special skilled assistants.

To this end the invention consists in a construction, combination and relation of parts hereinafter illustrated in a preferred form, it being understood that changes in proportion and details, in adapting the same to different types of cars, may be resorted to, within the scope of the appended claims, without departing from the principles involved.

In the drawings:—

Figure 1 is a side view of a combined brake and speed control lever, such as that ordinarily used on the Ford automobile, having a locking device embodying the invention applied thereto in the operative and locking position.

Fig. 2 is a plan view of the locking device showing the machine lever in section.

Fig. 3 is a sectional view of the device taken on a plane indicated by the line 3—3 of Fig. 1.

Fig. 4 is a similar sectional view taken on the plane indicated by the line 4—4 of Fig. 1.

Fig. 5 is a detail view in perspective of the attachment, the parts of which are shown separated for clearness in illustration.

Essentially the locking means consists of a support 10 adapted for permanent attachment to the brake and control lever indicated at 11, and a pad lock 12 mounted upon the support and having a pivotal relation therewith as at 13, so as to provide for the arrangement of the lock in either an operative or engaging position as shown in Figs. 1 and 2, or in an inoperative or disengaged position in which the clutch actuating element 14 carried by the control lever is free to perform its intended functions.

As illustrated the support consists of a sleeve of sheet metal or equivalent thereof disposed to embrace the upper portion of the control lever and the rod 15 by which connection is made between the clutch operating element 14 and the pivotal pawl 16, said sleeve being secured against accidental or surreptitious removal by means of rivets 17 or the like, and said sleeve is provided with an extension forming a bracket 18 which provides a seat disposed in a plane transverse to the control lever for the support of the casing of the lock 12, the lock casing preferably having an ear 19 which affords a means whereby said casing may be pivotally mounted upon the bracket as indicated by the relations shown in Fig. 5. Obviously when not required as a locking means the lock may be turned to one side where it will be supported out of the way of the hand of the operator in manipulating the control lever, whereas when required as a locking means, after the seating of the brakes of the machine by the proper movement of the control lever, (such movement obviously also disposing the transmission means in their inoperative relation), the lock may be swung to the position indicated in Fig. 2 so that the shackle 20 thereof embraces the grip portion 21 of the control lever and lies between such grip portion and the clutch operating element 14 to prevent the movement of the latter toward the former and hence the disengagement of the pawl 16 from the segment with which it coöperates in the ordinary construction of machines (such segment however not being illustrated in the drawing), and thus to prevent the release of the control lever and consequently the operation of the machine.

It will be obvious that the operation of applying the attachment consists merely in fitting the sleeve element of the support around the prescribed portion of the control lever and fastening it by means of the rivets or their equivalents. Having been applied the device is permanently arranged within convenient reach of the operator of the machine so that having set the brakes a continuation of the movement of the hand by which the lever has been manipulated will throw the lock into engaging position and snap the shackle into place where it is interposed between the clutch operating element and the grip of the control lever. Obviously the form of lock indicated in the drawing is merely illustrative and this feature is subject to modification to suit the preference of the manufacturer and the user, the essential feature being the permanent support of a lock of this general type within convenient reach of the operator of the machine and in such a relation to the control lever and the clutch operating element carried thereby as to permit of adjustment to effect the locking of the machine with a minimum of effort and loss of time upon that part of the operator.

Having thus fully described my invention, I claim:

1. In an automobile locking device, the combination of a control lever, a clutch operating element carried thereby, a bracket having lever engaging means, and a padlock pivotally carried by the bracket for swinging movement in a plane transverse to the lever and intersecting the path of releasing movement of the clutch operating element.

2. In an automobile locking device, the combination of a control lever, a clutch operating element carried thereby, a support consisting of a sleeve embracing said lever and provided with a bracket disposed in a plane transverse to the lever, and a padlock pivotally mounted upon said bracket for swinging movement relative to the lever and with its shackle in position to embrace the grip portion of the lever in the path of releasing movement of the clutch operating element.

In testimony whereof I affix my signature.

JAMES P. HEADLEY, Jr.